Patented Feb. 1, 1927.

1,616,321

UNITED STATES PATENT OFFICE.

JOHN J. KESSLER, OF ST. LOUIS, MISSOURI.

DRYING AND POLYMERIZING OIL AND METHOD OF MAKING SAME.

No Drawing.   Application filed May 9, 1924.  Serial No. 712,159.

The object of my invention is to produce an oil which has the properties of a drying oil; that is, it is converted from a viscous liquid to a film of solid material when it is spread on a surface and exposed to the air. At the same time this oil has the property of becoming polymerized when heated for a sufficient time at temperatures of about 150° C. The oxidization of the oil disclosed here- in takes place at ordinary temperatures, so that when it is exposed to the air in a thin film, or when it is incorporated with pigments and exposed to the air in a thin film, it dries at ordinary temperatures in a similar manner to the manner in which varnishes and paints dry. This oil does not polymerize at ordinary temperatures so that it may be kept indefinitely in a liquid condition in a closed container without material change in physical properties for many months. When the oil is heated in contact with air both polymerization and oxidization takes place and it is converted into a hard, tough, solid substance, the degree of hardness depending upon the length of time it is heated.

In the preparation of the oil disclosed in the present application, which oil has the general properties I have just described, I start with the coal tar fraction which boils between approximately 150° and 250° C. This fraction consists of a number of chemical bodies, some of which can be identified, but many of which have not been identified as chemical individuals.

Among the chemical bodies which may be identified are the phenols or tar acids, naphthalene, coumarone, indene. A portion of this oil goes under the name of creosote oil and contains hydrocarbons, saturated and unsaturated, together with various compounds of carbon hydrogen and oxygen, traces of compounds of carbon hydrogen and nitrogen. Usually such an oil will contain 20% to 50% of phenols or tar acids. The balance of the oil will consist of creosote oils which have been partly described as to their chemical character in the foregoing, but which are as already intimated of more or less indefinite chemical composition.

The properties of the drying and polymerizing oil disclosed herein do not depend upon the presence of any particular chemical individuals, but they depend upon the presence of the various constituents which are found in the coal tar fraction specified. The polymerizing of the oil depends, for instance, upon the presence of the phenols, but the drying qualities of the oil depend not only upon the phenols but upon the various other bodies present, because after the phenols are removed from the coal tar fraction a drying oil can still be made by my process from the remaining fractions. Furthermore, the properties of the finished product depend upon the mutually solvent action of the various constituents of the fraction, which solvent action is mutual whether the oil is in an undried, dried or polymerized condition.

When such a mixture of oils is subjected to the action of formaldehyde or similar substances which may be defined from the standpoint of chemical theory as containing a mobile methylene group, the phenol groups are acted upon to form polymerized resinous substances, but the action is somewhat different from the well known reaction whereby pure phenol is reacted upon by aldehyde bodies. Reaction takes place at a higher temperature; it is slower and it requires no pressure in order to prevent the formation of gas bubbles during the last stages of the reaction. Besides this, the reaction products are mutually soluble in each other and in the neutral bodies present in the mixture, so that no separation takes place. A thin film of the finished product dries to a homogenous transparent film, consisting of a solid resinous-like mass without gas bubbles and of considerable strength and toughness. In the reaction which I am describing it is worthy of note that the substances present of phenolic character are very much less in proportion than the other bodies present, but it is a fact that out of such a mixture which is originally oily and liquid a solid product can be produced either by oxidization or by polymerization.

In carrying out my invention I start with a fraction of coal tar oil which has a boiling point range between 150° C. and 300° C. without limiting myself to exactly this boiling range. I treat this oil with an amount of formaldehyde or of other aldehyde substances which is in excess of the amount required to completely polymerize the phenols present. In order to accelerate the reaction a basic catalyst, such as ammonia or sodium hydrate, may be added to the reacting mixture. I continue the heating until a liquid is obtained of the required viscosity. I find a temperature of about 150° C. to be practical temperature to conduct this heating. In order to illustrate the change which takes place in the viscosity of the oil on subjecting it to this treatment, I will say that a coal tar fraction, such as I have described, will have a viscosity when measured by a saybolt instrument at 100° F. of 20-50. After the reaction has proceeded to a practical degree for producing the finished product, the viscosity in the oil has been increased to 200-500 at the same temperature. The oil has, therefore, taken on considerable body and has valuable properties for a number of different uses, such as the manufacture of paints, varnishes, wood preservative, putty, roof cements and insulating compounds, and the usefulness of the oil in the manufacture of these products depends upon the fact that it is a drying oil as well as a polymerizing oil.

I claim:

1. The drying and polymerizing oil which is produced by the action of chemical bodies having a mobile methylene group upon the coal tar fraction having a boiling range of between approximately 150° C. and 250° C.

2. The drying and polymerizing oil which is produced by the action of formaldehyde upon the coal tar fraction having a boiling range of between approximately 150° C. and 250° C.

3. The drying and polymerizing oil which is produced by the action of formaldehyde and a basic catalyst upon the coal tar fraction having a boiling range of between approximately 150° C. and 250° C.

In testimony that I claim the foregoing I hereunto affix my signature.

JOHN J. KESSLER.